Patented Mar. 3, 1936

2,032,748

UNITED STATES PATENT OFFICE 2,032,748

PROCESS OF ESTERIFYING CELLULOSE

Joseph F. Haskins, Kenmore, N. Y., assignor to Du Pont Rayon Company, New York, N. Y., a corporation of Delaware No Drawing. Application July 24, 1931, Serial No. 553,006

8 Claims. (Cl. 260—101)

This invention relates to the preparation of cellulose esters and is an improvement on the process described in Haskins and Schulze application Serial Number 422,549, filed January 22, 1930.

It is known that cellulose can be esterified by the action of acid halides in the presence of tertiary amines in sufficient excess to produce a basic reaction mass. The cellulose ester resulting from this process has an undesirable color which is apparently caused by the reaction of some of the acid halide and some of the tertiary amine to form ketene and by the polymerization of ketene to form colored resins which are hard to remove. It is also known that cellulose may be esterified by the action of acid anhydrides in the presence of tertiary amines and, in particular, in the presence of pyridine. This reaction is, however, unsatisfactory in that the esterification is extremely slow and in that the products are in general of poor solubility.

In the copending application of Haskins and Schulze above identified it has been disclosed that acid anhydrides will esterify cellulose readily in the presence of tertiary amines provided appropriate catalysts are used. This reaction, because of the non-formation or less formation of objectionable by-products, produces a more easily purified product. This process is to be preferred to the process wherein acid chlorides are used except that in some cases the acid chloride is more conveniently or more economically prepared than the acid anhydride.

I have now discovered that, by the interaction of organic acid chlorides with organic carboxylic acids in the presence of certain tertiary amines, esterifying mixtures are secured which resemble in their action upon cellulose or other esterifiable hydroxyl-containing bodies the mixture of acid anhydride and tertiary amine salt described in the copending case.

My invention will be best understood by reference to the following examples, which are given by way of illustration and not in limitation:

Example I

To 320 parts of dioxane are added 48 parts of acetic acid and 62.4 parts of acetyl chloride. To this mixture is added slowly and with stirring 84.4 parts of pyridine, then 16.2 parts of cotton linters pulp. The mixture is placed in an appropriate container and heated under pressure, with stirring, at 125° C. until the reaction is complete. This will require 4–6 hours. The solution so obtained is in two phases; the lighter one consisting essentially of a solution of cellulose acetate in dioxane. This is coagulated by pouring in a small stream, or by forcing through small orifices into water. The coagulated material may be extracted by methyl alcohol and dried. The product is a triacetate of cellulose, soluble in chloroform and of exceptional physical properties.

Example II

Forty-eight grams of acetic acid and 62.4 grams of acetyl chloride are added to 320 grams of isoamyl acetate. To this mixture are added 84.4 grams of pyridine, while cooling and stirring. The reaction mixture, together with 16.2 grams of cotton linters pulp, is placed in a round bottom flask equipped with a stirrer and heated at the boiling temperature under reflux until the desired acetyl value is reached. Acetylation proceeds rather rapidly until a composition approximating a diacetate is reached and then more slowly. The product is in fibrous form and may be filtered off, washed with methyl alcohol and dried. This product even with a content of acetyl near the triacetate is insoluble in the usual solvents, though greatly swollen by them.

Example III

A reaction mixture is made up by adding carefully, with stirring, 84.4 grams of pyridine to a solution of 59.2 grams of propionic acid and 112 grams of benzoyl chloride in 270 grams chlorobenzene. This, together with 16.2 grams of cotton linters pulp, is heated under reflux with stirring, until solution of the cellulose is attained. The reaction mixture is subjected to steam distillation which coagulates the product and removes the volatile liquids. The coagulated product may be redissolved in dioxane, recoagulated in water and dried. It is a tripropionate of cellulose soluble in a variety of solvents such as chloroform or acetone.

Example IV

Six grams of benzoic acid and 3.5 grams of acetyl chloride are dissolved in ten grams of dioxane. To this are added, with stirring, four grams of pyridine and .8 grams cotton linters pulp. The mixture is placed in a glass tube, the tube sealed and heated at 125° C., shaking occasionally until solution of the cellulose takes place. This requires about 8–10 hours. The reaction mixture is coagulated in methyl alcohol, extracted with methyl alcohol and dried. It is cellulose acetate soluble in chloroform, dioxane, and other solvents.

Example V

To 2500 parts of dioxane are added 500 parts of acetyl chloride and 428 parts butyric acid. To this is added, while stirring, 659 parts pyridine. This mixture is placed in an appropriate container, equipped with a stirring device. One hundred and thirty parts of dried cotton linters pulp are added and the mixture heated at about 120°–125° under pressure. At the close of the reaction, the mixture is cooled somewhat, the lower layer drawn off, if desired, and the remainder coagulated by pouring it into water in a fine stream. When completely coagulated the product is extracted with methyl alcohol and dried. This preparation is a mixed acetate-butyrate of cellulose soluble in chloroform and many other solvents from which solutions it can be spun into threads or cast into films.

Example VI

To 35 grams of pyridine are added 22 grams palmitic acid, 11.2 grams benzoyl chloride and 1.9 grams of ethyl cellulose containing 16% ethyl. The mixture is heated for three or more hours coagulated in methyl alcohol, extracted with methyl alcohol and air dried. This gives about 6 grams of ethyl cellulose palmitate containing a high percentage of palmityl groups.

Example VII

It is also possible to use this invention in combination with known methods to secure mixed esters of aliphatic acids and acids which do not esterify readily. For instance, if an excess of benzoyl chloride is allowed to act on cellulose in the presence of pyridine and a diluent, at an elevated temperature, a certain amount of benzoyl is introduced. If, now, to the reaction mixture is added sufficient acetic acid to react with the rest of the benzoyl chloride and heating continued, the remaining hydroxyls of the cellulose are esterified by acetyl groups.

Ten and two tenths parts of benzoyl chloride are added to 28 parts of dioxane, 9.5 parts pyridine are added, while stirring, then 1.62 parts of cellulose. This reaction mixture is heated under pressure at about 125° C. for about an hour at which time the cellulose is very highly swollen. To the reaction mixture is added 4.2 parts glacial acetic acid and the heating under pressure continued until complete solution is obtained. The reaction mixture is then coagulated by pouring it into methyl alcohol and adding sufficient water to cause good coagulation. After filtering it is extracted with a mixture of methyl alcohol and water. The dried material is a mixed benzoate acetate of cellulose soluble in a number of solvents such as dioxane, chloroform, etc.

Example VIII 1000 parts acetyl chloride and 720 parts propionic acid are added to 5,000 parts of 1,4, dioxan. To this mixture is added, while stirring, 1500 parts of pyridine. A reaction takes place characterized by separation of a white crystalline substance. To the reaction mixture so secured are added 260 parts of oven dried cotton linters. The whole is then heated for four hours in a sealed enameled kettle with stirring at a temperature of about 125° C. At the end of this time, the reaction mixture is allowed to cool below 100° C. and the product coagulated by pouring the cooled mixture into water or methyl alcohol. After coagulation, the mixed ester is extracted with methyl alcohol and dried. This gives a cellulose ester of acetic and propionic acids soluble in chloroform, acetone, dichloroethylene and a number of other solvents.

Example IX 4500 parts of dioxane, 920 parts propionyl chloride and 740 parts propionic acid are mixed in an enameled lined kettle and 1400 parts pyridine added, while stirring, then 324 parts oven dried cotton linters. This mixture is heated at 125° C. for about six hours, under pressure and with stirring, is coagulated by pouring slowly in a fine stream into water or a mixture of water and methyl alcohol, and is extracted with alcohol and dried. The product is a tri-propionate of cellulose soluble in a large number of solvents, including chloroform, acetone and a mixture of toluene and ethyl acetate.

In certain of the foregoing examples a particular order of adding the ingredients to the reaction bath has been specified. This order is not, however, of the essence of the invention. Indeed, it may be stated that the order in which the ingredients are added to the bath is substantially immaterial.

I prefer in actual practice to carry out the process at a temperature of between about 100° C. and about 140° C. This range is not to be taken as a limitation, however, because the reaction proceeds both at temperatures below and above this range. In general for temperatures below 100° C. the esterification is satisfactory but the product tends to be insoluble and as the temperature approaches normal atmospheric temperature the intensity of the reaction tends to decrease. The temperature necessary to produce a product with satisfactory solubility varies somewhat with the ester produced. For example, a temperature above about 120° C. is advisable for the production of cellulose acetate. In the case of many other esters a soluble product is obtained at lower temperatures.

The viscosity of the ester is lowered as the temperature of the reaction is increased.

The reaction may be carried out at ordinary pressures or at higher pressures. In general, however, the use of pressures above atmospheric is recommended only where it is advisable to carry out the reaction above the boiling temperature of the bath in order to obtain a product of satisfactory solubility or viscosity characteristics.

In the process herein disclosed several conditions are possible: (1) both the chloride and the acid may have the same acid radical, in which case the ester will be simple; (2) the chloride and acid may have different acid radicals each with approximately the same esterifying power toward cellulose, in which case the ester will be a mixed ester; (3) the chloride and acid may have different acid radicals with widely different esterifying powers toward cellulose, in which case the ester will be substantially a simple ester of the acid having the stronger esterifying action.

Through the specification reference has been made to the use of an organic acid chloride. It is to be understood, however, that other halides than the chloride may be used.

In the manufacture of cellulose esters by treating cellulose with an acid, an acid chloride of a different acid having a markedly different esterifying power, and pyridine, the cellulose ester will tend to be predominantly an ester of the acid which has the more powerful esterifying action even in some cases to the extent of being a simple ester. For example, a mixture of benzoyl chloride, acetic acid, and pyridine or a mixture of acetyl chloride, benzoic acid, and pyridine will yield an ester which is practically exclusively cellulose acetate.

This discovery makes it possible to use a readily available and comparatively cheap acid chloride, such as benzoyl chloride, to promote the esterification of cellulose with an acid, the acid chloride of which may be difficult or expensive to prepare. I have prepared in this manner, for example, the acetate, propionate, butyrate, palmitate, and oleate of cellulose by using benzoyl chloride, pyridine, and the acid whose ester is desired.

While, for purposes of illustration, I have suggested the use of equimolecular quantities of the acid and acid chloride, this is not an essential feature and in practice an excess of either may be used. In general, when an excess of the acid is used, esterification is somewhat slower so that a slight excess of the acid chloride may be preferred. Thus, it is quite possible to use an excess of acid chloride sufficient to take up the water present in the reagents. This will liberate a certain amount of acid which may be deducted from the amount of free acid added. The acid liberated during the esterification may also be taken into account.

There should preferably be sufficient pyridine present in the reaction to combine with any hydrochloric acid produced both because free hydrochloric acid has a degrading effect upon the cellulose and because this quantity of pyridine provides sufficient pyridine hydrochloride to effectively catalyze the reaction. An excess of pyridine beyond that required to combine with hydrochloric acid may advantageously be used.

While pyridine is used as the amine in the preferred form of the invention, it is obvious that other tertiary amines may be used, such as quinoline or dimethyl aniline.

It may sometimes be of advantage to add to the reaction bath an amount of a pure anhydride of one of the acid radicals of the bath, or of a different acid, whereby to secure a proportion of reactants more favorable to the progress of the particular reaction.

The esterification of cellulose by the process set forth in this specification has the following advantages: It permits the use of acid chlorides which, in many cases, are more conveniently and more economically prepared than the equivalent acid anhydrides; although an acid chloride is used the reaction is not attended with the formation of the highly colored and difficultly purifiable compounds which are formed in the customary acid halide-tertiary amine process; it provides a very efficient and simple method of producing mixed esters having the advantage over processes heretofore known that the acid chloride of only one of the desired acid nuclei is used.

As many apparently widely different embodiments of this invention may be made without departing from the spirit and scope thereof, it is to be understood that I do not limit myself to the specific embodiments thereof except as defined in the appended claims.

I claim:
1. The method of esterifying cellulose which comprises heating cellulose with propionic acid, acetyl chloride, pyridine, and dioxane at a temperature between 100° C. and 140° C.
2. The method of esterifying cellulose which comprises heating cellulose in a bath prepared by mixing an organic acid having the formula RCOOH, an organic acid chloride having the formula R'COCl, and pyridine, in which R is alkyl or aryl, and R' is alkyl.
3. The method of esterifying cellulose which comprises reacting cellulose with the contents of a bath prepared by mixing an organic acid having the formula RCOOH, an organic acid halide having the formula R'COHal, and a tertiary amine, in which R is alkyl or aryl, and R' is alkyl, and Hal is a halogen.
4. The method of making the cellulose ester of an aliphatic acid which comprises heating cellulose in a bath prepared by mixing an aliphatic organic acid, an acid halide of the organic acid, and a tertiary amine.
5. The method of making the cellulose ester of an aliphatic acid which comprises heating cellulose in a bath prepared by mixing an aliphatic organic acid, an acid chloride of the organic acid, and a tertiary amine.
6. The method of making the cellulose ester of an aliphatic acid which comprises heating cellulose in a bath prepared by mixing benzoic acid, an aliphatic acid halide, and a tertiary amine.
7. The method of making the cellulose ester of an aliphatic acid which comprises heating cellulose in a bath prepared by mixing benzoic acid, an aliphatic acid chloride, and a tertiary amine.
8. The method of making the cellulose ester of an aliphatic acid which comprises heating cellulose in a bath prepared by mixing benzoic acid, acetyl chloride, and a tertiary amine.

JOSEPH F. HASKINS.